(12) United States Patent
Kirkley

(10) Patent No.: US 10,772,264 B2
(45) Date of Patent: Sep. 15, 2020

(54) SYSTEM AND METHOD FOR GROWING PLANTS IN AN URBAN ENVIRONMENT

(71) Applicant: Marcia Kirkley, New York, NY (US)

(72) Inventor: Marcia Kirkley, New York, NY (US)

( * ) Notice: Subject to any disclaimer, the term of this patent is extended or adjusted under 35 U.S.C. 154(b) by 26 days.

(21) Appl. No.: 15/056,028

(22) Filed: Feb. 29, 2016

(65) Prior Publication Data
US 2017/0245441 A1 Aug. 31, 2017

(51) Int. Cl.
A01G 9/02 (2018.01)
A01G 22/00 (2018.01)
A01G 9/033 (2018.01)

(52) U.S. Cl.
CPC .............. *A01G 22/00* (2018.02); *A01G 9/02* (2013.01); *A01G 9/028* (2013.01); *A01G 9/033* (2018.02)

(58) Field of Classification Search
CPC .......... A01G 1/007; A01G 9/02; A01G 9/027; A01G 9/028; A01G 9/104
USPC ............... 47/65.9, 66.1, 66.5, 66.6, 66.7, 79
See application file for complete search history.

(56) References Cited

U.S. PATENT DOCUMENTS

| | | | | |
|---|---|---|---|---|
| 3,298,133 A * | 1/1967 | Courtright | ............. | A01G 9/102 47/61 |
| 4,287,682 A * | 9/1981 | Browne | ................. | A01G 27/04 47/65.8 |
| 4,926,586 A * | 5/1990 | Nagamatsu | ........... | E04D 11/002 47/65.9 |
| 7,596,906 B2 * | 10/2009 | Gold | ..................... | E04D 11/002 47/1.01 F |
| 8,011,135 B2 * | 9/2011 | Masser | .................. | A01G 27/04 47/79 |
| 8,091,279 B2 * | 1/2012 | Stewart | ................ | A01G 27/005 47/60 |
| 8,365,467 B1 * | 2/2013 | Livingston | .............. | E02B 3/125 47/65.9 |
| 8,707,618 B2 * | 4/2014 | MacKenzie | ............ | A01G 1/002 47/65.7 |
| 2011/0179708 A1 * | 7/2011 | Stewart | ................ | A01G 27/005 47/65.9 |
| 2011/0283612 A1 * | 11/2011 | Law | ........................ | A01G 1/007 47/60 |
| 2014/0026480 A1 * | 1/2014 | Lenhart, Jr. | ............ | A01G 1/007 47/65.9 |
| 2016/0081283 A1 * | 3/2016 | Pierce | .................... | A01G 27/06 47/80 |

* cited by examiner

Primary Examiner — David J Parsley
(74) Attorney, Agent, or Firm — Dunlap Bennett & Ludwig, PLLC

(57) ABSTRACT

A system for growing plants in an urban setting is provided. The system includes a container. The container is made of a watertight material. The container includes a base and a sidewall extending from the base forming a receptacle within. The present invention further includes a cell layer. The cell layer includes a horizontal base and a plurality of vertical extending cell walls forming a plurality of water cells therebetween. A porous layer covers the cell layer. The porous layer includes a plurality of pores permitting molecules the size of water and smaller to pass through. The cell layer covered with the porous layer are disposed within the receptacle. The cell layer is then covered with soil.

6 Claims, 4 Drawing Sheets

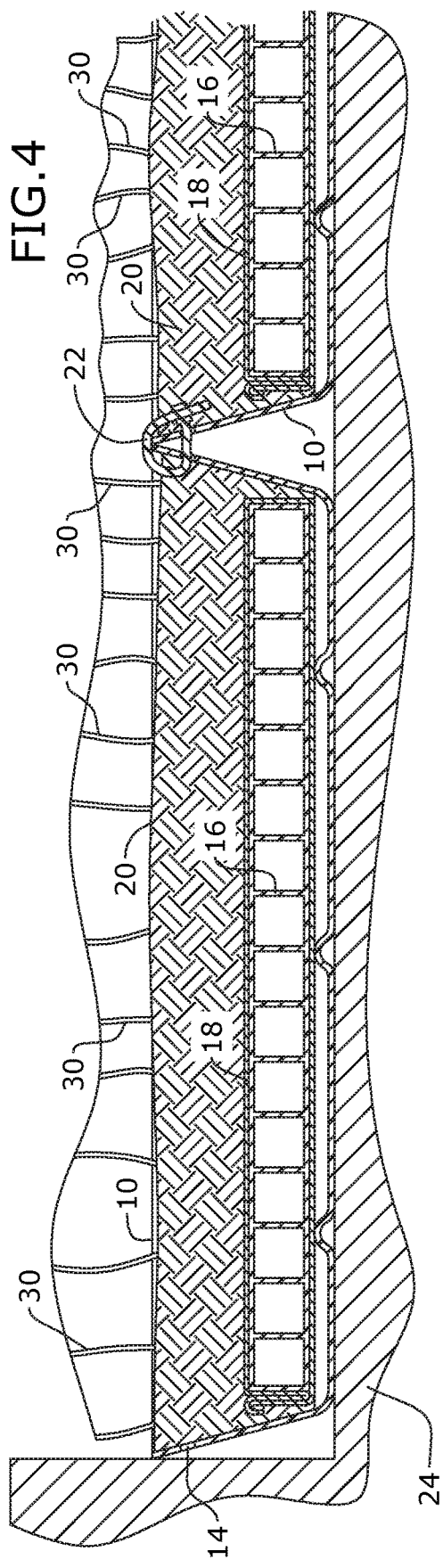
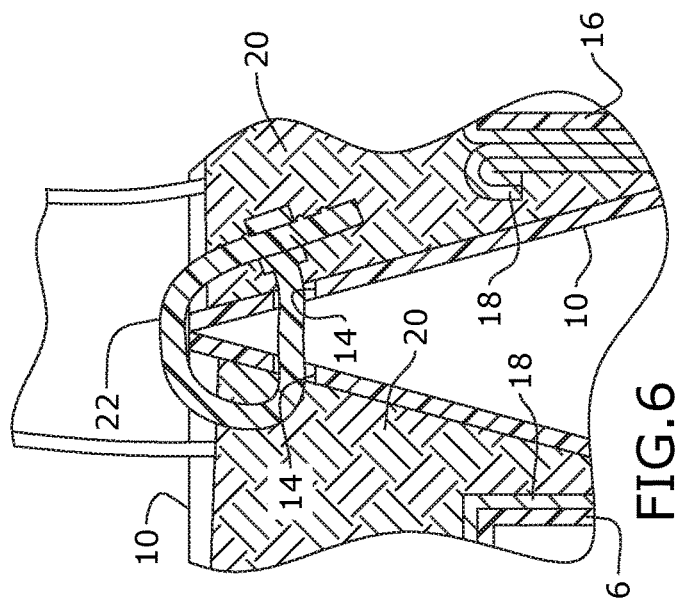
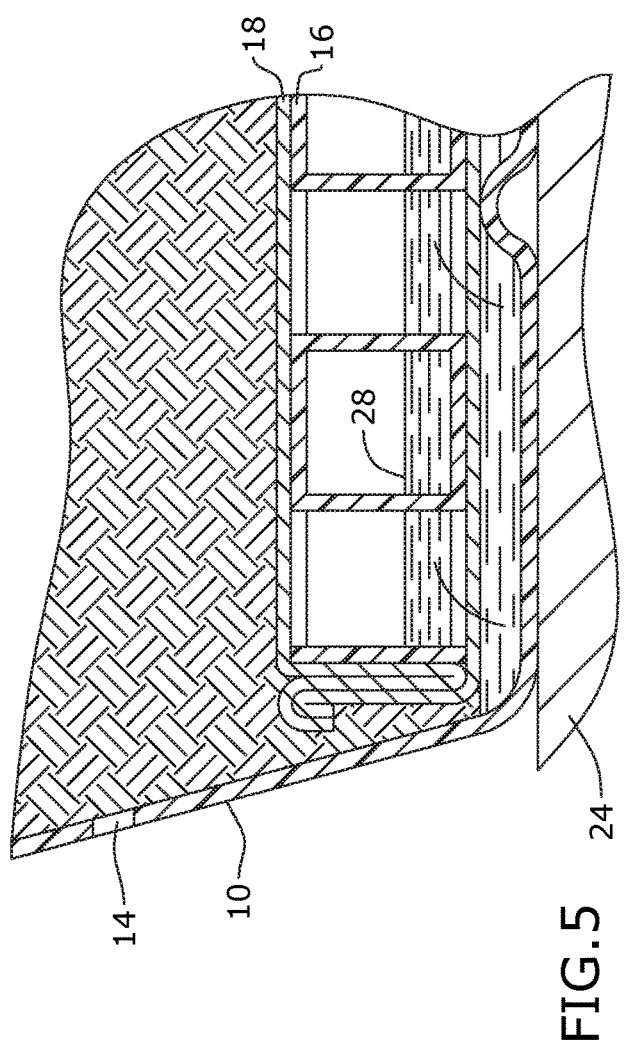

SYSTEM AND METHOD FOR GROWING PLANTS IN AN URBAN ENVIRONMENT

BACKGROUND OF THE INVENTION

The present invention relates to growing plants and, more particularly, to a system and method for growing plants in an urban environment.

Currently, too much rainwater infiltrates our sewers because cities are covered with impervious services: in the form of roads, roofs, parking lots, and sidewalks. When there is too much rain in sewers they overflow into nearby water bodies of water, often overflowing raw sewage along with the rain. This pollutes our waters, causing beaches to close and other water recreation suspended until the sewage clears.

Cities experience urban heat effect, where they get hotter and experience more polluted air than in rural areas. Sometimes cities can be 4-8 degrees hotter in the day and 20-30 degrees hotter at night.

Most green roof technology using existing systems on the market (both in tray and loose laid form) let the rain water go down the drain, once it passes through the soil layer. Therefore, the water isn't saved for future passive irrigation opportunities and some of it gets into the sewer system.

As can be seen, there is a need for an improved system and method for growing plants in an urban environment that captures more of the rain, easing the burden on our overtaxed sewer systems.

SUMMARY OF THE INVENTION

In one aspect of the present invention, a system for growing plants comprises: a container formed of watertight material and comprising a base and a sidewall extending from the base forming a receptacle within; a cell layer comprising a horizontal base and a plurality of vertical extending cell walls forming a plurality of water cells therebetween; and a porous layer covering the cell layer wherein a plurality of pores of the porous layer are sized to permit water to pass through, wherein the cell layer covered with the porous layer are disposed within the receptacle.

In another aspect of the present invention, a method of growing plants comprises: providing a cell layer comprising a horizontal base and a plurality of vertical extending cell walls forming a plurality of water cells therebetween; covering the cell layer with a porous layer comprising a plurality of pores sized to permit water to pass through; placing the cell layer and the porous layer inside a container comprising a watertight material; covering the cell layer and the porous layer with a topsoil; and planting at least one of a plant and a seed in the topsoil.

These and other features, aspects and advantages of the present invention will become better understood with reference to the following drawings, description and claims.

BRIEF DESCRIPTION OF THE DRAWINGS

FIG. 4 is a section view of the present invention from 4-4 in FIG. 1 illustrated without water for clarity;

FIG. 5 is an enlarged section view of an embodiment of the present invention;

FIG. 6 is an enlarged section view illustrating a tie between trays;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a green roof, watertight tray design that collects rainwater and uses it to irrigate the plants. The present invention captures 100% of the rain because the trays are watertight. The system and method of the present invention helps reduce heat even more by having these trays hold water below the vegetative layer. The evaporation of water helps cool the air. Cities could also put water into the trays on very hot dry days to proactively fight the heat.

Figure 1:
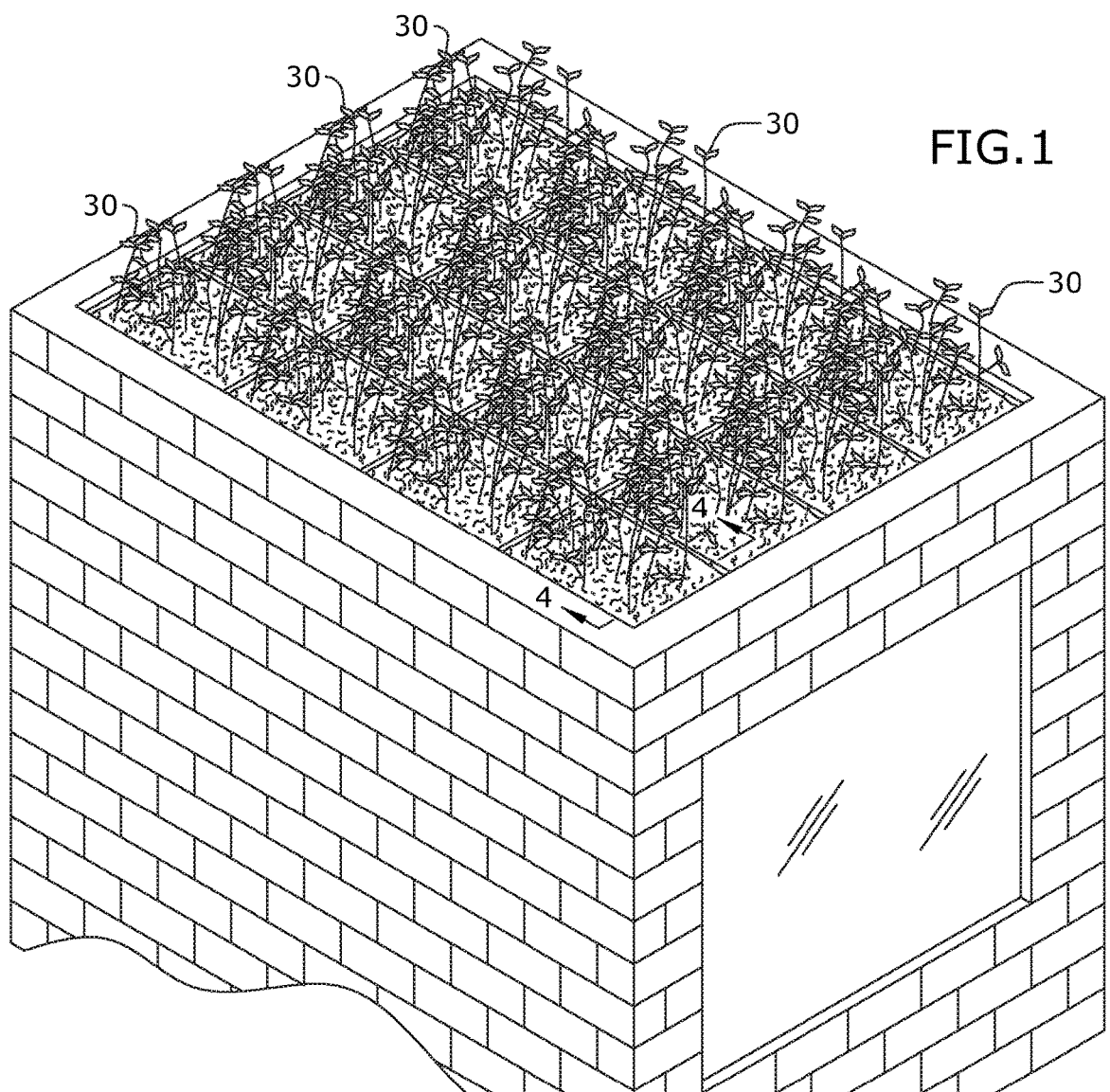
FIG. 1 is a perspective view of an embodiment of the present invention shown in use on a roof.
Figure 2:
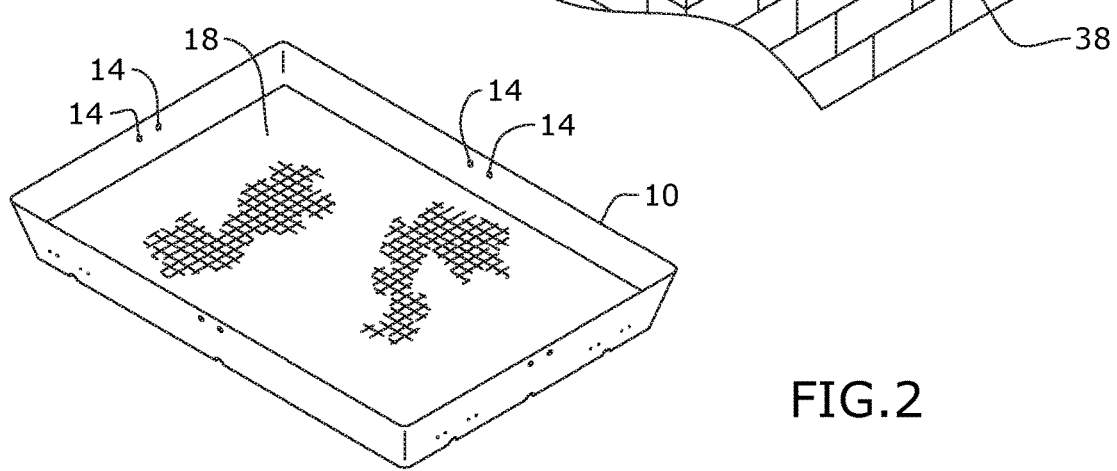
FIG. 2 is a perspective view of an embodiment of the present invention.
Figure 3:
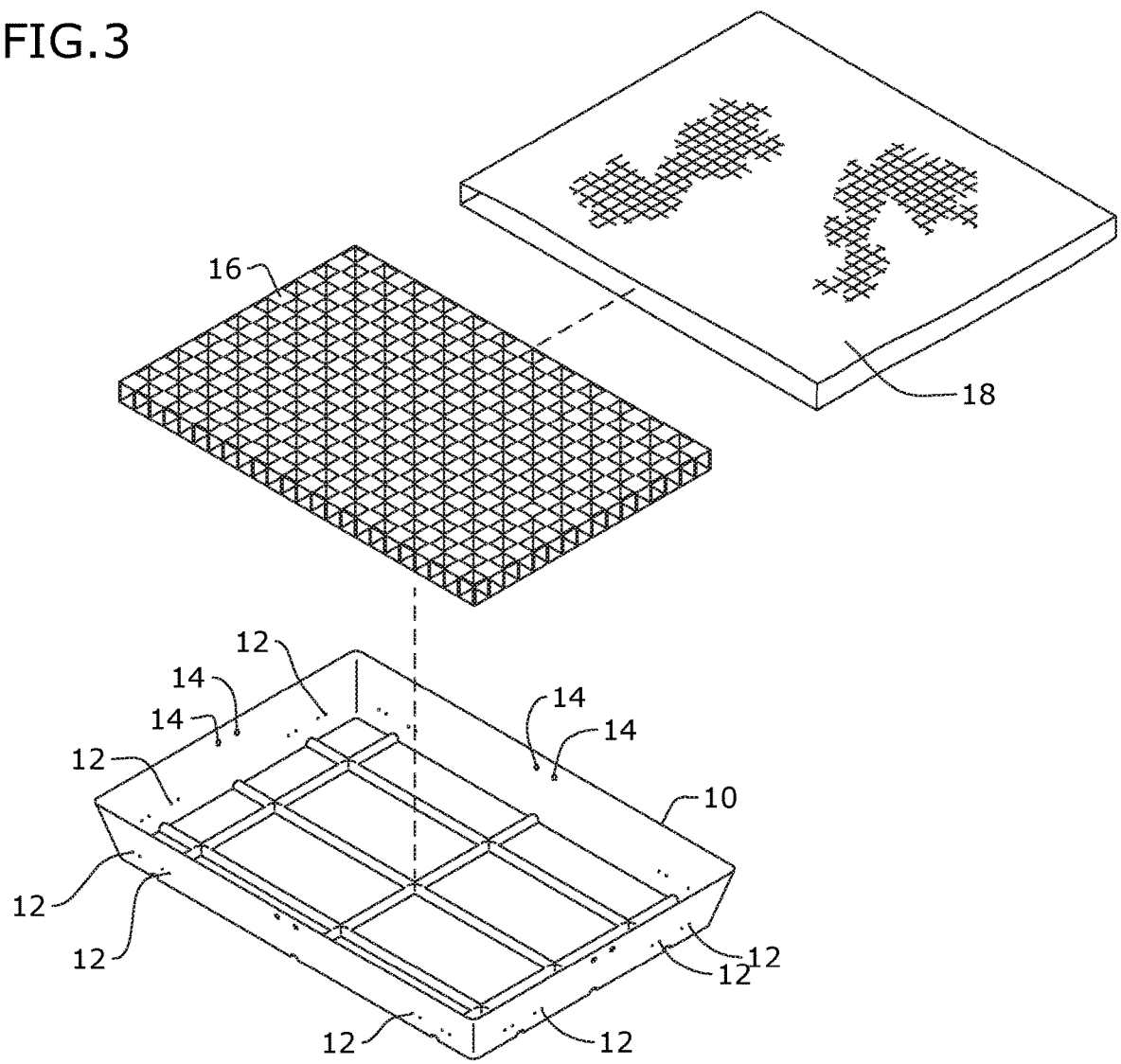
FIG. 3 is an exploded view of an embodiment of the present invention.
Figure 7:
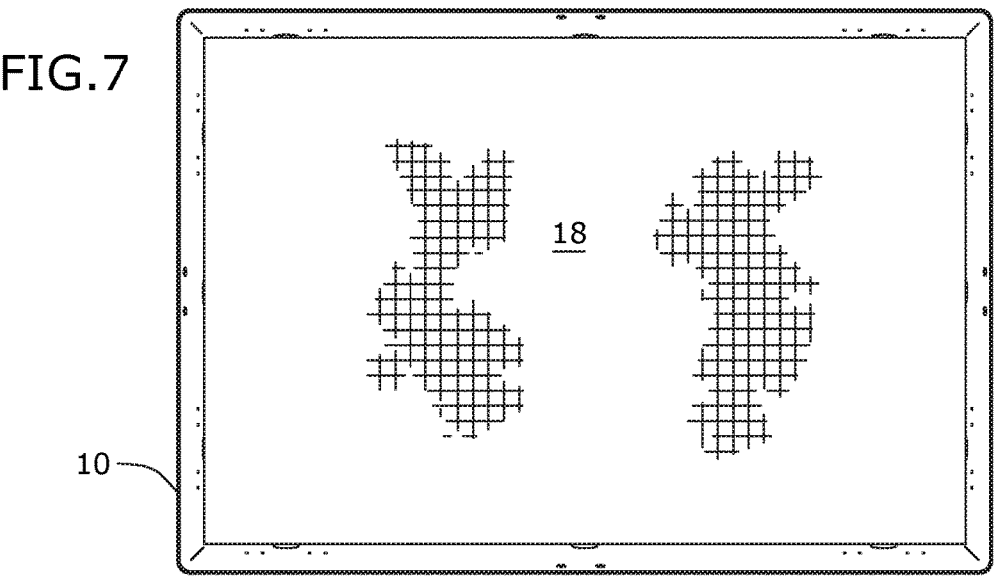
FIG. 7 is a top view of an embodiment of the present invention.
Figure 8:
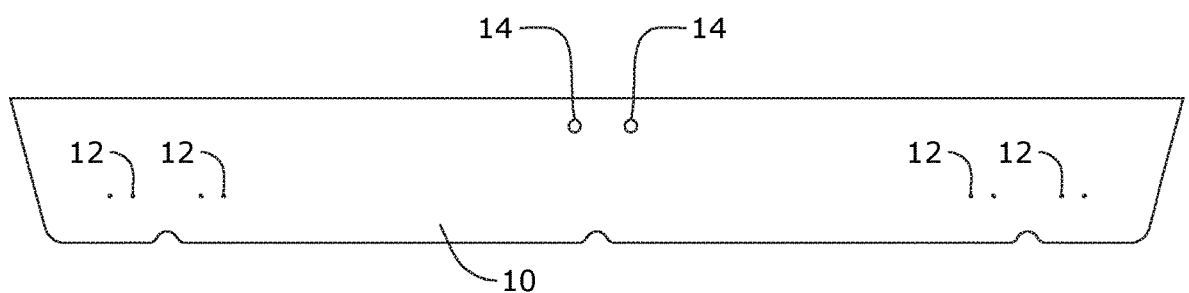
FIG. 8 is a front view of an embodiment of the present invention.
Figure 9:
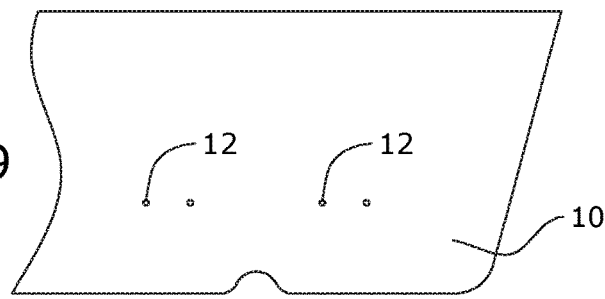
FIG. 9 is an enlarged view of an embodiment of the present invention.
Figure 10:
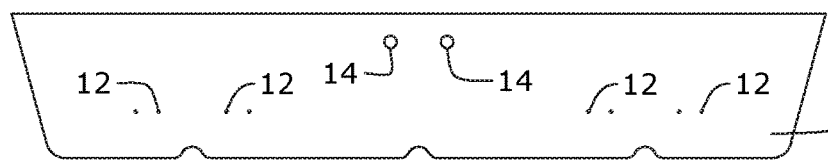
FIG. 10 is side view of an embodiment of the present invention.

Referring to FIGS. 1 through 10, the present invention includes a system for growing plants 30 in an urban setting. The system includes a container 10. The container 10 is made of a watertight material. The container 10 includes a base and a sidewall extending from the base forming a receptacle within. The present invention further includes a cell layer 16. The cell layer 16 includes a horizontal base and a plurality of vertical extending cell walls forming a plurality of water cells therebetween. A porous layer 18 covers the cell layer 16. The porous layer 18 includes a plurality of pores permitting molecules the size of water and smaller to pass through. The cell layer 16 covered with the porous layer 18 are disposed within the receptacle.

The container 10 of the present invention is made of a watertight material, such as high-density polyethylene (HDPE) plastic. However, the container 10 may be made of any durable material that is water tight. The container 10 may be in the form of a plurality of trays disposed on a roof 24 of a building 26. Each of the trays may include weep holes 12 formed through the sidewall, which drains water at a desired maximum height within the receptacle. For example, the weep holes 12 may be disposed just above the cell layer 16, allowing the 'soil/plant layer' to remain dry and aerobic. Each of the containers 10 may also include tie holes 14 so that the plurality of trays may be tied together via ties 22. In certain embodiments, the container 10 may include ridges protruding from the base. The cell layer 16 and the porous layer 18 rest on the plurality of ridges.

As mentioned above, the cell layer 16 includes a horizontal base and a plurality of vertical extending cell walls forming a plurality of water cells therebetween. The cell layer 16 may be made from a durable plastic that creates a 'false floor' for the plants 30 and soil 20 to reside on, and below the floor is a lot of open space for the water to reside. In certain embodiments, the plurality of vertical extending cell walls crisscross one another so that the plurality of water cells are each cuboid shaped. Water 28 may fill each cuboid shaped water cell.

The porous layer 18 covers the cell layer 16 such that the soil 20 and the roots do not enter the cuboid shaped water cells. The porous layer 18 may be made of a heavy duty landscape fabric, such as a woven fabric layer. The cell layer 16 may be wrapped with this material. As mentioned above, the porous layer 18 keeps the soil and roots from entering the cell layer 18, thus leaving maximum open space for water storage. In certain embodiments, the porous layer 18 may include a plurality of pores that only allow molecules the size of water and smaller to pass through.

In certain embodiments, the porous layer 18 may include a bottom non-absorbent layer and a top absorbent layer. In such embodiments, the top absorbent layer may include a capillary mat made of an absorbent fabric that wicks water up to the top of the container. Further, in certain embodiments, the capillary mat may be formed with the non-absorbent layer or separate from the non-absorbent layer. The absorbent capillary mat fabric may be draped over the top of the wrapped (or 'pocketed') cell layer 16. The mat may cover the false floor made by the cell layer 16 and drape down into the bottom of the container 10 along the sides and resting within the water. Thus the mat pulls water from below and keeps the porous layer 18 constantly damp.

The present invention includes multiple components that work together to contain all the rain and keep it separate from the plants. There are two distinct zones: the water area on the bottom, and the dry soil area above. Weep holes may be drilled on the side of the tray at the desired 'dry area' height. The internal floor, which separates the two, does provide water to the plants above by wicking the water below up to the soil area. This can provide passive irrigation to the plants for days and weeks, depending on the amount of water below and the weather conditions.

The present invention further includes a method of growing plants. The method includes providing the cell layer as described above. The cell layer is then covered with the porous layer described above. The cell layer and porous layer are than placed inside the container. Topsoil is placed on top of the cell layer and the porous layer. Plants and/or seeds are then planted into the top soil. In certain embodiments, the present invention includes a plurality of containers that are placed on top of a building. The containers are tied together to keep the containers lined up and prevent gaps between containers. When it rains, the rain water runs through the topsoil and into the plurality of water cells. The water is then absorbed by the porous layer and the roots absorb the water from the porous layer. The present invention facilitates a green roof that may be placed on rooftops of buildings within cities.

It should be understood, of course, that the foregoing relates to exemplary embodiments of the invention and that modifications may be made without departing from the spirit and scope of the invention as set forth in the following claims.

What is claimed is:

1. A system for growing plants comprising:
 a container formed of watertight material and comprising a base and a sidewall extending from the base forming a receptacle within;
 the base of the container comprises a plurality of ridges;
 a cell layer comprising a horizontal base and a plurality of cell walls extending perpendicularly from the horizontal base;
 the horizontal base and the plurality of cell walls define a plurality of water cells;
 the horizontal base is supported by the plurality of ridges; and
 a fabric layer wrapped around the cell layer and covering a top and a bottom of the cell layer, wherein the fabric layer comprises a top absorbent layer and a bottom non-absorbent layer,
 wherein the cell layer covered with the fabric layer are disposed within the receptacle.

2. The system of claim 1, wherein the sidewalls of the container comprise comprises four sides, wherein each of the four sides comprise a plurality of weeping holes formed therethrough.

3. The system of claim 1, wherein the container comprises a tray, wherein a plurality of trays is disposed on a roof of a building.

4. A method of growing plants comprising:
 providing a plurality of plant receptacles each comprising:
  a container formed of watertight material and comprising a base and a sidewall extending from the base forming a receptacle within, wherein the sidewall comprises a plurality of tie holes;
  the base of the container comprises a plurality of ridges;
  a cell layer comprising a horizontal base and a plurality of cell walls extending perpendicularly from the horizontal base;
  the horizontal base and the plurality of cell walls define a plurality of water cells;
  the horizontal base is supported by the plurality of ridges; and
  a fabric layer wrapped around the cell layer, the fabric layer comprising a top absorbent layer and a bottom non-absorbent layer, wherein the cell layer and the fabric layer are disposed within the container;
 placing the plurality of plant receptacles on a roof of a building;
 connecting adjacent plant receptacles together via a plurality of ties and the plurality of tie holes;
 covering the cell layer and the fabric porous layer with a topsoil; and
 planting seeds in the topsoil.

5. The method of claim 4, wherein the sidewalls of the container comprises four sides, wherein each of the four sides comprise a plurality of weeping holes formed therethrough.

6. The method of claim 4, wherein the fabric porous layer is a woven fabric layer.

\* \* \* \* \*